United States Patent
Mueller et al.

(10) Patent No.: US 8,342,741 B2
(45) Date of Patent: Jan. 1, 2013

(54) METHOD FOR OPERATING A SENSOR ARRANGEMENT

(75) Inventors: Harald U. Mueller, Fulda (DE); Paul Szasz, Plankstadt (DE); Ralf Huck, Großkrotzenburg (DE); Steffen Keller, Karlsruhe (DE); Tilo Merlin, Linsengericht (DE)

(73) Assignee: ABB AG, Mannheim (DE)

( * ) Notice: Subject to any disclaimer, the term of this patent is extended or adjusted under 35 U.S.C. 154(b) by 618 days.

(21) Appl. No.: 11/846,030

(22) Filed: Aug. 28, 2007

(65) Prior Publication Data

US 2008/0069179 A1 Mar. 20, 2008

(30) Foreign Application Priority Data

Aug. 29, 2006 (DE) .................. 10 2006 040 408

(51) Int. Cl.
*G01D 18/00* (2006.01)
*G06F 11/07* (2006.01)
*G01K 15/00* (2006.01)
*G01K 3/04* (2006.01)

(52) U.S. Cl. ............ 374/1; 374/103; 702/183; 702/104; 73/1.01; 703/2

(58) Field of Classification Search .................. 374/100, 374/102–104, 120, 129, 29–30, 135, 112, 374/141, 1, 4; 702/99, 85, 108, 104, 130, 702/182, 183, 189, 193, 127; 340/500, 501, 340/516, 517, 518, 519; 73/1.01, 156; 703/2
See application file for complete search history.

(56) References Cited

U.S. PATENT DOCUMENTS

| | | | | | |
|---|---|---|---|---|---|
| 4,475,823 | A | * | 10/1984 | Stone ................................. | 374/1 |
| 4,575,803 | A | * | 3/1986 | Moore .......................... | 701/100 |
| 4,787,053 | A | * | 11/1988 | Moore .......................... | 701/123 |
| 4,825,195 | A | * | 4/1989 | Berruyer ....................... | 340/501 |
| 5,291,423 | A | * | 3/1994 | Roosli ............................ | 702/82 |
| 5,539,381 | A | * | 7/1996 | Johnson ........................ | 340/584 |
| 5,703,575 | A | * | 12/1997 | Kirkpatrick ............... | 340/870.17 |
| 6,034,607 | A | * | 3/2000 | Vidaillac ....................... | 340/585 |
| 6,173,903 | B1 | * | 1/2001 | Loscher et al. .............. | 236/78 B |
| 6,191,399 | B1 | * | 2/2001 | Van Bilsen .................... | 219/497 |
| 6,286,992 | B1 | * | 9/2001 | Kyrtsos .......................... | 374/45 |
| 6,337,468 | B1 | * | 1/2002 | Worthington et al. ........ | 219/497 |
| 6,351,116 | B1 | * | 2/2002 | Bolda et al. .................... | 324/202 |

(Continued)

FOREIGN PATENT DOCUMENTS

DE  40 22 954  A1  1/1992

(Continued)

*Primary Examiner* — Gail Verbitsky
(74) *Attorney, Agent, or Firm* — Buchanan Ingersoll & Rooney PC

(57) ABSTRACT

A method is disclosed for operating a sensor arrangement having at least one measuring sensor and at least one reference sensor for recording the same physical variable, and having an analysis unit electrically connected thereto, with a characteristic of the sensor arrangement being recorded in an initialization phase from measured values of the at least one measuring sensor and of the at least one reference sensor, and an alarm being given during continuous operation if the deviation from the characteristic lies outside a tolerance band. It is proposed to suspend the alarm dynamically so long as the changes in the measured value in the variation over time of the at least one measuring sensor or in the variation over time of the at least one reference sensor differ by more than a definable limit within a definable time interval.

13 Claims, 1 Drawing Sheet

U.S. PATENT DOCUMENTS

| | | | |
|---|---|---|---|
| 6,754,601 B1 * | 6/2004 | Eryurek et al. | 702/104 |
| 6,850,859 B1 * | 2/2005 | Schuh | 702/104 |
| 6,852,085 B2 * | 2/2005 | Rubinstein | 600/549 |
| 6,932,809 B2 * | 8/2005 | Sinofsky | 606/12 |
| 6,971,790 B2 * | 12/2005 | Quinn et al. | 374/1 |
| 7,050,917 B2 * | 5/2006 | Schroeder | 702/104 |
| 7,142,210 B2 * | 11/2006 | Schwuttke et al. | 345/440 |
| 7,507,019 B2 * | 3/2009 | Price | 374/1 |
| 7,558,691 B2 * | 7/2009 | Mueller et al. | 702/104 |
| 2004/0193380 A1 * | 9/2004 | Schroeder | 702/104 |
| 2007/0203650 A1 * | 8/2007 | Jensen et al. | 702/3 |
| 2007/0237201 A1 * | 10/2007 | Ignatowicz | 374/7 |
| 2007/0255163 A1 * | 11/2007 | Prineppi | 600/549 |
| 2007/0257642 A1 * | 11/2007 | Xiao et al. | 320/134 |
| 2009/0299543 A1 * | 12/2009 | Cox et al. | 700/299 |

FOREIGN PATENT DOCUMENTS

| | | |
|---|---|---|
| DE | 102 42 128 A1 | 3/2004 |
| DE | 10 2004 044 335 A1 | 4/2006 |
| EP | 1 182 438 B1 | 1/2004 |
| JP | 2002017144 A * | 1/2002 |

\* cited by examiner

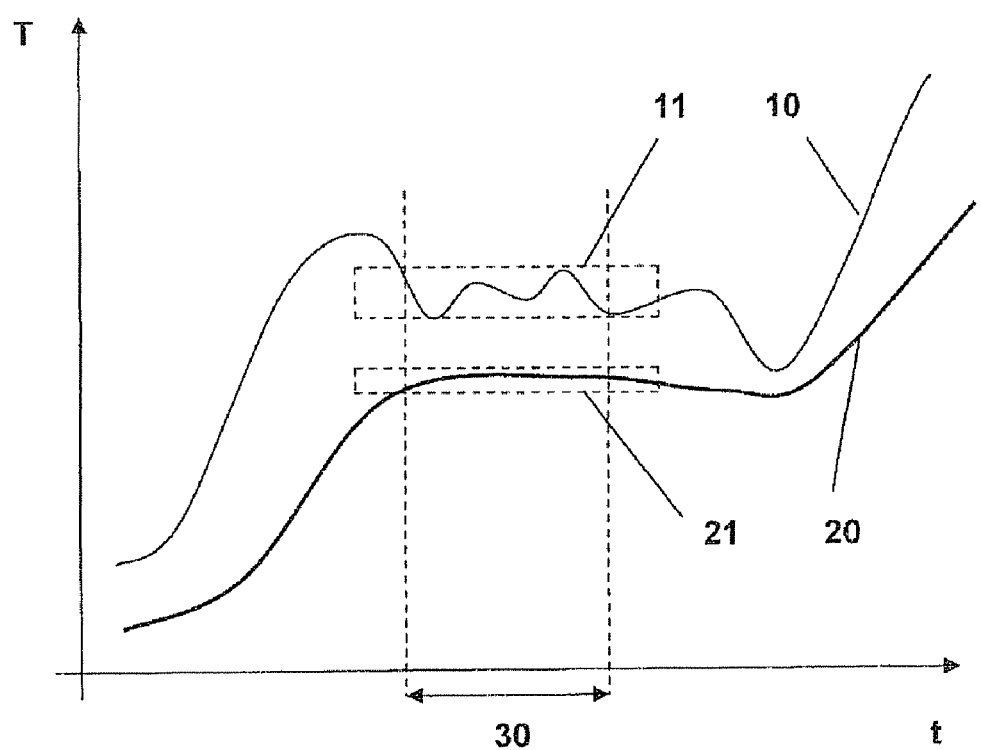

METHOD FOR OPERATING A SENSOR ARRANGEMENT

RELATED APPLICATIONS

This application claims priority under 35 U.S.C. §119 to German Application 10 2006 040 408.4 filed in Germany on Aug. 29, 2006, the entire contents of which are hereby incorporated by reference in their entireties.

TECHNICAL FIELD

A method is disclosed for operating a sensor arrangement having at least one measuring sensor and at least one reference sensor for recording the same physical variable, and having an analysis unit electrically connected thereto.

BACKGROUND INFORMATION

In many sectors of industrial process and instrumentation engineering, precise knowledge of a given physical variable is required for optimum process control. In this case, such a sensor arrangement is required to meet high standards such as robust construction, high resistance to vibration and thermal shock, insensitivity to chemically corrosive media and, if applicable, to radioactive radiation. These conditions must be satisfied cumulatively depending on the place of installation. Furthermore, the sensors should also exhibit high measurement accuracy and high reproducibility over long periods of time.

It is known that the characteristic of a measuring sensor changes as a result of events during use and aging. As the deviation from the known characteristic of the measuring sensor increases, its measurement accuracy falls. High measurement accuracy can hence only be guaranteed if the accuracy of the sensors is checked from time to time by calibration. The sensor has to be removed from the installation for this purpose.

EP 1 182 438 B1 discloses a sensor arrangement comprising two different sensor types, in which a correction value for the measured value of the physical variable is calculated during an initialization phase from the difference in the detected measured values of the sensor of the first type and of the sensor of the second type, and is added so that the calculated resultant measured values for both sensors are practically equal. In the subsequent measurement and operation phase, both the respective resultant measured values and their deviations are monitored in order to detect aging-dependent drift phenomena, and an alarm is given if a limit is violated.

Owing to the individual sensors having a different response to the dynamic behavior of the process during the measurement and operation phase, there may be a dynamic miscalibration of the sensor arrangement resulting in a false alarm.

In addition, there can be an accumulation of effects caused by different measurement principles, by the distance of each individual sensor from the source of the physical variable, hysteresis and manufacturing tolerances amongst identical types of sensors.

SUMMARY

An object of the disclosure is hence to define for the known sensor arrangement a drift detection procedure in which false alarms from limit violation caused by the dynamic behavior of the process are avoided.

The disclosure makes use of the fact that drift is a very slow-working process that is essentially caused by changes in the material in the sensing elements.

The disclosure is also based on a sensor arrangement having at least one measuring sensor and at least one reference sensor for recording the same physical variable, and having an analysis unit electrically connected thereto, with a characteristic of the sensor arrangement being recorded in an initialization phase from measured values of the at least one measuring sensor and of the at least one reference sensor, and an alarm being given during continuous operation if the deviation from the characteristic lies outside a tolerance band.

According to the disclosure, the alarm is dynamically suspended so long as the changes in the measured value of the at least one measuring sensor or of the at least one reference sensor differ by more than a definable limit within a definable time interval. Thus the alarm is not given until the dynamic behavior of the process starts to settle, but then the alarm remains permanently set until it is cleared, irrespective of the continued dynamic behavior of the process.

In the context of this disclosure, it is intended that the change in measured value within a definable time interval includes any variation over time of the measured value within the time interval.

In the context of this disclosure, it is further intended that alarms are understood to mean any form of visual, acoustic or other signaling suitable for attracting the attention of the user. Multilevel signaling can be implemented, where warnings precede the alarms.

False alarms as a result of measurements by separate sensors of variations over time of a highly dynamic physical process variable are thereby advantageously avoided.

In addition, in the case of temperature measurement, the disclosure can manage with the means of the known temperature sensor arrangement. In fact, a reference sensor for the measuring sensor is sufficient to implement the disclosure.

According to another feature of the disclosure, the limit is adjusted dynamically to suit the changes in measured value as a function of the changes in measured value of the at least one measuring sensor and of the at least one reference sensor within the definable time interval. This provides a reliable means of avoiding false alarms even for a process with highly dynamic behavior.

BRIEF DESCRIPTION OF THE DRAWING

Further details and advantages of the invention are explained in greater detail below in an exemplary embodiment relating to a temperature sensor arrangement.

As exemplified by the single FIGURE, variations over time of measured signals are plotted in the single FIGURE as temperature values T over time t.

DETAILED DESCRIPTION

In the simplest case, the temperature sensor arrangement comprises a measuring sensor and a reference sensor and an analysis unit electrically connected thereto. The measuring sensor and the reference sensor can be of identical and different design here. The variation over time of the measured temperature value of the measuring sensor is denoted in the FIGURE by the reference numeral 10, and the variation over time of the measured temperature value of the reference sensor is denoted in the FIGURE by the reference numeral 20.

The measuring sensor and the reference sensor can be housed in a container sealed from the process, which protects the sensors from the process medium. In particular, a protective tube known per se can be provided for this purpose. An enclosure for accommodating the analysis unit is arranged at the opposite end of the protective tube from the process medium.

The characteristic of the sensor arrangement is available from the initialization phase from measured temperature-dependent differences in the measured values of the measuring sensor and of the reference sensor. In the initialization phase, an initialization measured value is obtained for the measuring sensor 10, and an initialization measured value is obtained for the reference sensor 10.

An alarm is given during continuous operation if the deviation from the associated characteristic value lies outside a tolerance band. For this purpose, the differences in measured value of the measuring sensor and of the reference sensor are calculated and compared with the associated characteristic value.

As soon as the calculated difference in measured value deviates from the associated characteristic value by more than the permitted tolerance band, it is assumed that there is a defect in the sensor arrangement, and an alarm is given that the tolerance band has been breached. The alarm is dynamically suspended in this case so long as one of the changes in the measured value of the measuring sensor and of the reference sensor differs by more than a definable limit within a definable time interval. The definable limit constitutes one of a maximum value and a minimum value.

The FIGURE shows the variations 10 and 20 over time of the measured temperatures of the measuring sensor and of the reference sensor, with superimposed tolerance bands 11 and 21. The tolerance bands 11 and 21 constitute a range of tolerable values of the measured temperature value of the measuring sensor and the measured temperature value of the reference sensor, respectively. Thermal equilibrium is assumed if, within a definable time interval 30 constituting a defined period of time, both the variation 10 over time of the measured temperature value of the measuring sensor remains within the tolerance band 11, and the variation 20 over time of the measured temperature value of the reference sensor remains within the tolerance band 21.

In order to detect drift, the measured temperatures of the measuring sensor and of the reference sensor are recorded, and the temperature change within a definable time interval 30 is determined separately for each sensor.

The change in measured value from each sensor includes here any variation 10 and 20 over time of the measured value within the time interval 30. In the simplest case, the change in the measured value is the difference between the measured value at the end of the time interval and the measured value at the beginning of the time interval 30.

In a further exemplary embodiment of the disclosure, it can be provided to adjust the limit dynamically to suit the changes in measured value as a function of the changes in the measured value of the measuring sensor and of the reference sensor within the definable time interval. In particular, it can be provided to adjust the limit proportionally to the changes in measured value within the definable time interval 30. Thereby for a process with a highly dynamic behavior, and correspondingly large changes in measured value, in which the differences in the changes in measured value of the sensors, for example as a result of different positions because of structural constraints, also increase, the limit is dynamically increased, and in the quasi-stationary process it is dynamically reduced. Hence the alarm is adjusted dynamically to the prevailing process conditions.

In a further exemplary embodiment of the disclosure, it can be provided, where changes in measured value within the definable time interval 30 are small in the quasi-stationary process, to calculate the deviation directly from the difference in the measured values of the measuring sensor and of the reference sensor and the associated characteristic value of the sensor arrangement.

Where absolute changes in measured value within the definable time interval 30 are large, and differences between the changes in measured value of the measuring sensor and the changes in measured value of the reference sensor are small, it can be provided to use statistical methods to calculate the deviation from a plurality of reference values. In an alternative embodiment, it can be provided to use analytical methods to calculate the deviation from a plurality of reference values. Both embodiments have the common feature of recording initially a plurality of datapoints in the operating range of the sensor arrangement, to which a statistical or analytical method is applied in a subsequent sequence of steps.

In a further exemplary embodiment of the disclosure, it can be provided to record in the initialization phase a point in the characteristic of the sensor arrangement if the changes in measured value of the measuring sensor and of the reference sensor remain within a definable limit range within a definable time interval.

If the temperature changes of the measuring sensor and of the reference sensor lie below a definable limit for each separate sensor within a definable time interval 30, the temperature sensor arrangement is in thermal equilibrium and a new characteristic value is recorded. The new characteristic value is the difference between the measured temperature value of the measuring sensor and the measured temperature value of the reference sensor.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES 10, 20 variation over time
11, 21 tolerance band
30 time interval

What is claimed is:

1. A method for operating a sensor arrangement having at least one measuring sensor and at least one reference sensor for recording the same physical variable, and having an analysis unit electrically connected thereto, the method comprising:

recording a characteristic of the sensor arrangement in an initialization phase from an initialization measured value of the at least one measuring sensor and an initialization measured value of the at least one reference sensor;

obtaining a tolerance band constituting a range of tolerable values of at least one of a measured value of the at least one measuring sensor and a measured value of the at least one reference sensor based on the recorded characteristic;

obtaining a definable limit constituting one of a maximum value and a minimum value by which at least one of the measured value of the at least one measuring sensor and the measured value of the at least one reference sensor is permitted to differ within a definable time interval constituting a defined period of time;

determining if there are changes to the measured values by determining, during operation of the sensor arrangement, if a deviation of at least one of the measured value of the at least one measuring sensor and the measured value of the at least one reference sensor from the recorded characteristic lies outside the tolerance band;

outputting an alarm during operation of the sensor arrangement if it is determined that the deviation of at least one of the measured value of the at least one measuring sensor and the measured value of the at least one reference sensor from the recorded characteristic lies outside the tolerance band;

wherein, when the deviation lies outside the tolerance band, the alarm is dynamically suspended if it is determined that changes in at least one of the measured value of the at least one measuring sensor and the measured value of the at least one reference sensor differ by more than the definable limit within the definable time interval.

2. The method as claimed in claim 1, wherein the definable limit is adjusted dynamically to suit the changes in measured value as a function of the changes in measured value of the at least one measuring sensor and of the at least one reference sensor within the definable time interval.

3. The method as claimed in claim 2, wherein the definable limit is adjusted proportionally to the changes in measured value within the definable time interval.

4. The method as claimed in claim 1,
wherein when the determined changes within the definable time interval are small, the deviation is calculated from the difference in the measured values of the at least one measuring sensor and of the at least one reference sensor and the associated characteristic value of the sensor arrangement.

5. The method as claimed in claim 1,
wherein when the determined changes within the definable time interval are large, and differences between the changes in measured value of the at least one measuring sensor and the changes in measured value of the at least one reference sensor are small, known statistical methods are used to calculate the deviation from a plurality of reference values.

6. The method as claimed in claim 1,
wherein when the determined changes within the definable time interval are large, and differences between the changes in measured value of the at least one measuring sensor and the changes in measured value of the at least one reference sensor are small, analytical methods are used to calculate the deviation from a plurality of reference values.

7. The method as claimed in claim 1, wherein in the initialization phase, a point in the characteristic of the sensor arrangement is recorded if the changes in measured value of the at least one measuring sensor and of the at least one reference sensor remain within a definable limit range within a definable time interval.

8. The method as claimed in claim 2, wherein when changes in measured value within the definable time interval are small, the deviation is calculated from the difference in the measured values of the at least one measuring sensor and of the at least one reference sensor and the associated characteristic value of the sensor arrangement.

9. The method as claimed in claim 3, wherein when changes in measured value within the definable time interval are small, the deviation is calculated from the difference in the measured values of the at least one measuring sensor and of the at least one reference sensor and the associated characteristic value of the sensor arrangement.

10. The method as claimed in claim 2,
wherein when the determined changes within the definable time interval are large, and differences between the changes in measured value of the at least one measuring sensor and the changes in measured value of the at least one reference sensor are small, known statistical methods are used to calculate the deviation from a plurality of reference values.

11. The method as claimed in claim 3,
wherein when the determined changes within the definable time interval are large, and differences between the changes in measured value of the at least one measuring sensor and the changes in measured value of the at least one reference sensor are small, known statistical methods are used to calculate the deviation from a plurality of reference values.

12. The method as claimed in claim 2,
wherein when the determined changes within the definable time interval are large, and differences between the changes in measured value of the at least one measuring sensor and the changes in measured value of the at least one reference sensor are small, known analytical methods are used to calculate the deviation from a plurality of reference values.

13. The method as claimed in claim 3,
wherein when the determined changes within the definable time interval are large, and differences between the changes in measured value of the at least one measuring sensor and the changes in measured value of the at least one reference sensor are small, known analytical methods are used to calculate the deviation from a plurality of reference values.

* * * * *